(12) United States Patent
Raghuvaran et al.

(10) Patent No.: US 12,044,172 B2
(45) Date of Patent: Jul. 23, 2024

(54) AIR GUIDE FOR A GAS TURBINE ENGINE

(71) Applicant: General Electric Company, Schenectady, NY (US)

(72) Inventors: Vaishnav Raghuvaran, Bengaluru (IN); Sesha Subramanian, Bengaluru (IN); Hari Krishna Meka, Bengaluru (IN); Vishnu Vardhan Venkata Tatiparthi, Bengaluru (IN); Raghuveer Chinta, Bengaluru (IN); Daniel O'Brien, Cincinnati, OH (US); Sai Raju Ippili, Bengaluru (IN); Michael Thomas Hogan, Tewksbury, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/148,559

(22) Filed: Dec. 30, 2022

(65) Prior Publication Data
US 2024/0141834 A1    May 2, 2024

(30) Foreign Application Priority Data

Nov. 2, 2022   (IN) .............................. 202211062689

(51) Int. Cl.
*F01D 25/12* (2006.01)
*F01D 25/14* (2006.01)
(Continued)

(52) U.S. Cl.
CPC ................ *F02C 7/18* (2013.01); *F01D 25/12* (2013.01); *F01D 25/14* (2013.01); *F02C 7/28* (2013.01);
(Continued)

(58) Field of Classification Search
CPC .... F02C 7/18; F02C 7/28; F01D 25/12; F01D 25/14; F01D 5/085; F05D 2220/32; F05D 2240/55; F05D 2260/201
See application file for complete search history.

(56) References Cited

U.S. PATENT DOCUMENTS

| 5,297,386 | A | | 3/1994 | Kervistin |
| 5,555,721 | A | * | 9/1996 | Bourneuf .................. F02C 7/18 |
| | | | | 415/115 |

(Continued)

FOREIGN PATENT DOCUMENTS

GB            2299378 A       10/1996

*Primary Examiner* — Sabbir Hasan
*Assistant Examiner* — Arthur Paul Golik
(74) *Attorney, Agent, or Firm* — Dority & Manning, P.A.

(57) ABSTRACT

A gas turbine engine that defines a radial direction and axial direction. The gas turbine engine includes a compressor section that includes a high pressure compressor. The high pressure compressor includes an aft-most compressor stage. The aft-most compressor stage includes a rotor, a low pressure shaft, a high pressure shaft drivingly coupled to the high pressure compressor. The high pressure shaft includes a central spool member and a forward spool member. The forward spool member extending between the central spool member and the aft-most compressor stage. The aft-most compressor stage further includes an air guide coupled to the aft-most compressor stage and the high pressure shaft. The air guide and a radially inward side of the forward spool member together defines an air flow passage for providing a cooling air flow.

8 Claims, 8 Drawing Sheets

(51) Int. Cl.
*F02C 7/18* (2006.01)
*F02C 7/28* (2006.01)

(52) U.S. Cl.
CPC ...... *F05D 2220/32* (2013.01); *F05D 2240/55* (2013.01); *F05D 2260/201* (2013.01)

(56) References Cited

U.S. PATENT DOCUMENTS

| | | | |
|---|---|---|---|
| 6,361,277 | B1 | 3/2002 | Bulman et al. |
| 6,382,903 | B1 | 5/2002 | Caruso et al. |
| 6,585,482 | B1 * | 7/2003 | Liotta ................ F02C 7/18 415/144 |
| 7,017,349 | B2 | 3/2006 | Laurello et al. |
| 7,993,102 | B2 | 8/2011 | Desai et al. |
| 8,087,249 | B2 | 1/2012 | Ottaviano et al. |
| 8,277,170 | B2 | 10/2012 | Hess et al. |
| 8,348,608 | B2 | 1/2013 | Willett et al. |
| 8,932,007 | B2 | 1/2015 | Khanin et al. |
| 8,979,470 | B2 | 3/2015 | Riazantsev et al. |
| 9,115,586 | B2 * | 8/2015 | Jan ................... F01D 5/066 |
| 9,670,780 | B2 | 6/2017 | Baxley |
| 9,719,425 | B2 | 8/2017 | Roush |
| 10,087,775 | B2 | 10/2018 | Mulcaire |
| 10,837,288 | B2 | 11/2020 | Suciu et al. |
| 11,060,530 | B2 | 7/2021 | Petrasko et al. |
| 2005/0230922 | A1 * | 10/2005 | Maguire ............ F16C 33/6677 277/409 |
| 2014/0248122 | A1 | 9/2014 | Vetters et al. |
| 2014/0290272 | A1 | 10/2014 | Mulcaire |
| 2015/0308341 | A1 | 10/2015 | Hiester |
| 2016/0076379 | A1 | 3/2016 | Forcier et al. |
| 2016/0076381 | A1 | 3/2016 | Suciu et al. |
| 2016/0186571 | A1 | 6/2016 | Suciu et al. |
| 2016/0312615 | A1 | 10/2016 | Lyons |
| 2016/0333700 | A1 | 11/2016 | Taheny |
| 2017/0002834 | A1 | 1/2017 | Powell et al. |
| 2017/0030196 | A1 | 2/2017 | Pirker et al. |
| 2017/0211590 | A1 | 7/2017 | Moniz et al. |
| 2018/0328177 | A1 * | 11/2018 | Turner ................ F01D 5/084 |

* cited by examiner

FIG. 8

AIR GUIDE FOR A GAS TURBINE ENGINE

PRIORITY INFORMATION

The present application claims priority to Indian Patent Application Number 202211062689 filed on Nov. 2, 2022.

FIELD

The present disclosure generally relates to a gas turbine engine, and more specifically, an air guide for a gas turbine engine.

BACKGROUND

A gas turbine engine generally includes a fan and a turbomachine arranged in flow communication with one another. Additionally, the turbomachine of the gas turbine engine includes, in serial flow order, a compressor section, a combustion section, a turbine section, and an exhaust section. In operation, air is provided from the fan to an inlet of the compressor section where one or more axial compressors progressively compress the air until it reaches the combustion section to provide combustion gases. The combustion gases are routed from the combustion section to the turbine section. The flow of combustion gasses through the turbine section drives the turbine section and is then routed through the exhaust section, e.g., to the atmosphere.

Operation of the gas turbine engine may create undesired heat. Accordingly, improvements to address heat generation or to attenuate heat generated would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled" and the like refer to both direct coupling as well as indirect coupling through one or more intermediate components or features, unless otherwise specified herein.

For purposes of the description hereinafter, the term "longitudinal" and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the term "integral" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

The present disclosure is generally related to a gas turbine engine defining a radial direction and an axial direction. The gas turbine engine includes a compressor section, a high pressure shaft including a forward spool member, and an air guide defining at least in part an air flow passage that provides a cooling air flow to the forward spool member to cool the forward spool member. During operation, the forward spool member may be operating at a temperature limit of the material that forms the forward spool member. As a result, cooling of the forward spool member may be desired during operation. The provided disclosure presents an air flow passage defined by the air guide that is configured to provide a cooling air flow to reduce the temperature of the forward spool member during operation by directing an airflow from between high and low pressure spools onto a radially inner side of the forward spool member.

Figure 1:
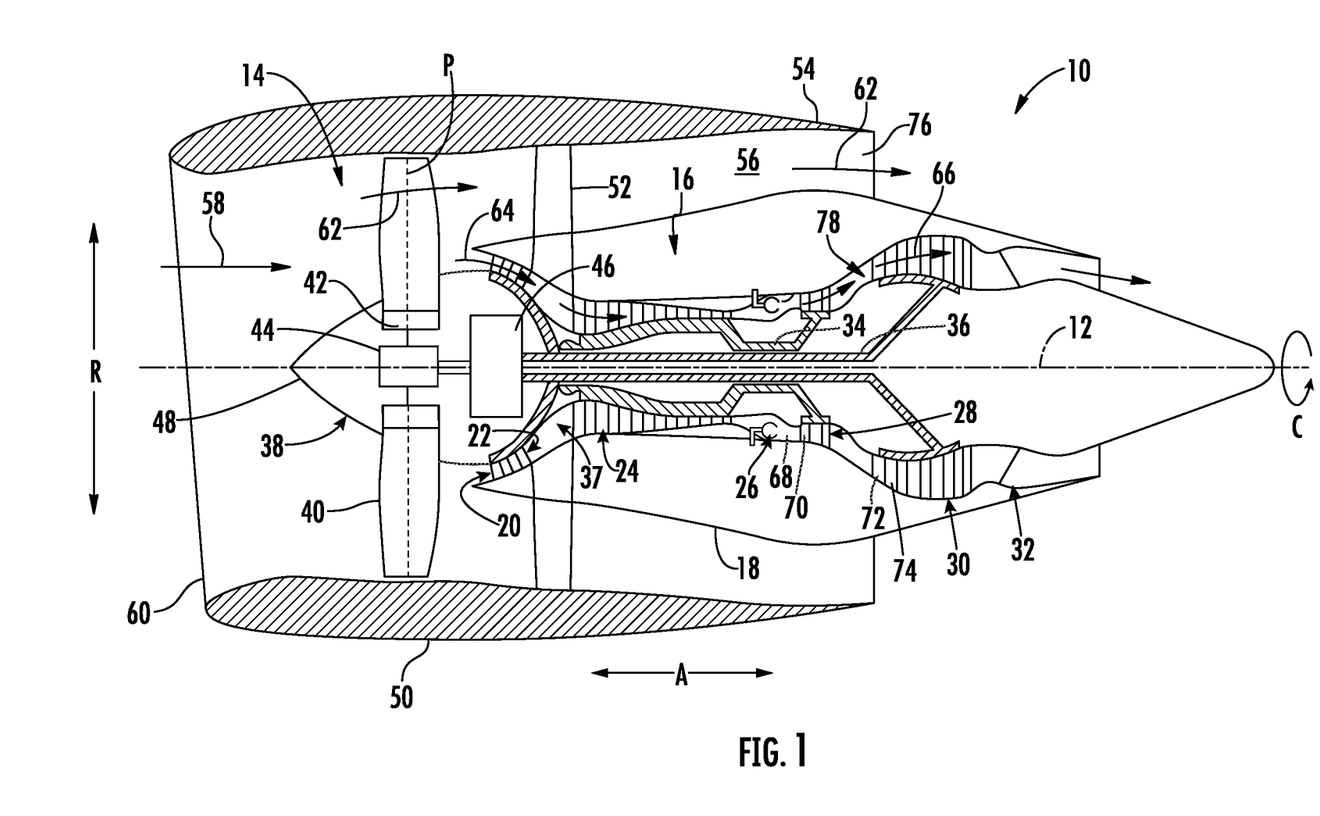
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
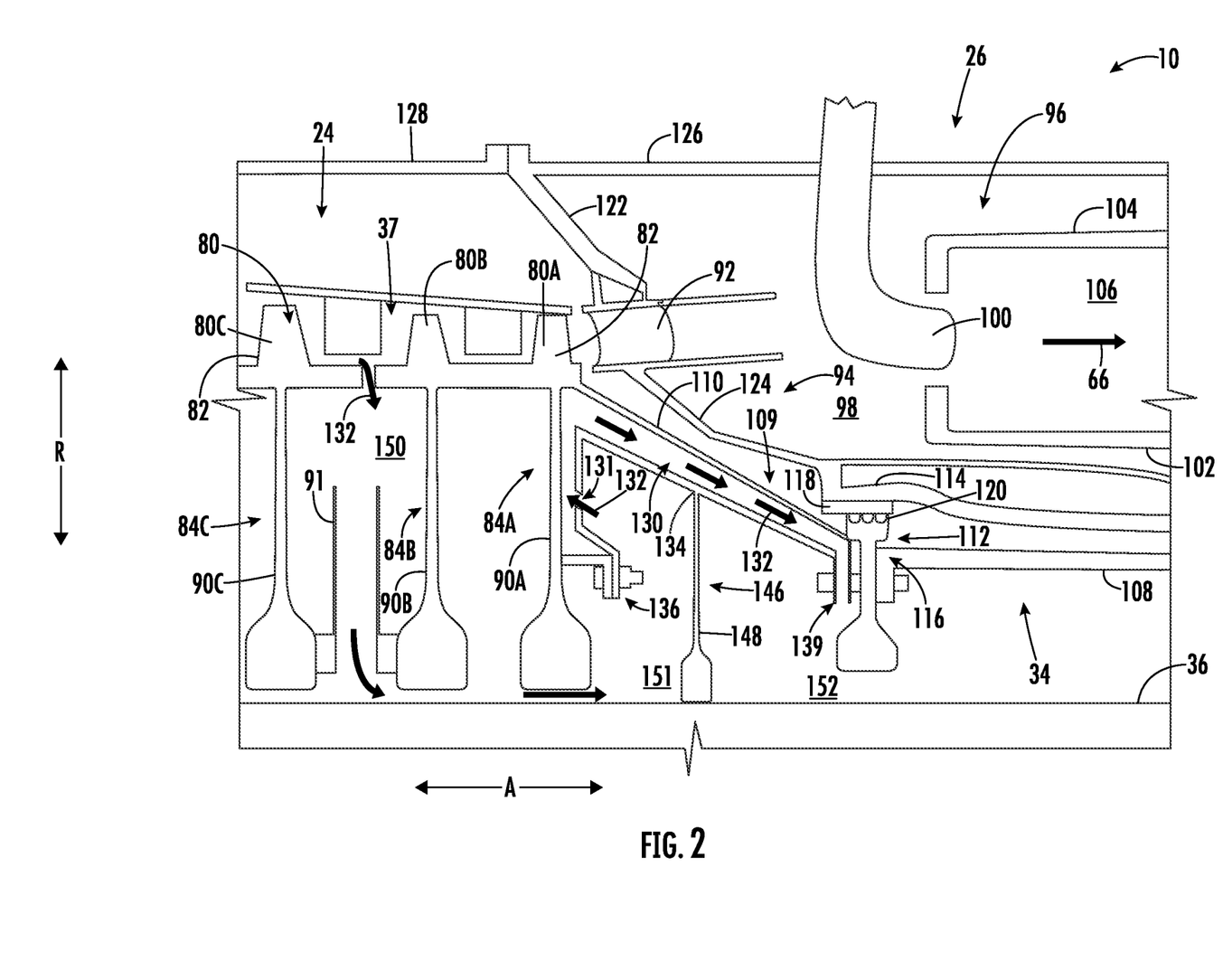
FIG. 2 is a cross sectional view of the compressor section and the combustion section in accordance with the exemplary aspect of the present disclosure.

Referring now also to FIG. 2, a cross-sectional view of the compressor section and of the combustion section 26 in accordance with the exemplary aspect of the present disclosure is provided. More specifically, FIG. 2 depicts an aft end of the HP compressor 24 of the compressor section, in addition to a forward end of the combustion section 26.

As noted above, during operation of the gas turbine engine 10, an airflow through the working gas flowpath 37 of the gas turbine engine 10 is sequentially compressed as it flows through the compressor section, or more specifically, as it flow through the LP compressor 22 and the HP compressor 24. The compressed air from the compressor section is then provided to the combustion section 26, wherein at least a portion of the compressed air is mixed with fuel and burned to create the combustion gases 66. The combustion gases 66 flow from the combustion section 26 to the turbine section, and more specifically, sequentially through the HP turbine 28 and the LP turbine 30, for the embodiment depicted, driving the HP turbine 28 and the LP turbine 30. The HP shaft 34 is drivingly coupled to both the HP turbine 28 and the HP compressor 24.

Referring now specifically to FIG. 2, the HP compressor 24 includes a plurality of compressor stages 80, with each compressor stage 80 including, e.g., a plurality of HP compressor rotor blades 82 and a rotor 84. Each of the various compressor stages 80 is drivingly coupled to the HP shaft 34, such that the HP turbine 28 may drive the HP compressor 24 through the HP shaft 34. Amongst the plurality of compressor stages 80 of HP compressor 24, is an aft-most compressor stage 80A including a rotor 84A having a bore 90A extending inwardly generally along the radial direction R, a second compressor stage 80B including a rotor 84B having a bore 90B extending inwardly generally along the radial direction R, and a third compressor stage 80C including a rotor 84C and a bore 90C extending inwardly generally along the radial direction R. The aft-most compressor stage 80A is located at an aft end of the HP compressor 24 followed in turn by the second compressor stage 80B located upstream of the aft-most compressor stage 80A. The second compressor stage 80B followed in turn by the third compressor stage 80C located upstream of the second compressor stage 80B. As will be described in more detail below, the HP compressor 24 includes a guiding tube 91 that fluidly couples a bleed air flow cavity 150 and a forward inter shaft cavity 151. The forward inter shaft cavity 151 is defined at least in part by the compressor stages 80, and more specifically, the bore 90A, 90B, and 90C. Additionally, the guiding tube 91 is coupled to and held in place by the bore 90B and the bore 90C.

As it will be appreciated, during operation as the compressed air is provided to the combustion section 26, a cooling air flow 132 of the compressed air is directed or routed from an upstream portion of the working gas flowpath 37 into the bleed air flow cavity 150 defined at least in part by the second compressor stage 80B and the third compressor stage 80C. The bleed air flow is then directed or routed into the guiding tube 91. The guiding tube 91 is configured to affect a swirl of the cooling air flow 132 in the circumferential direction C before being directed or routed into the forward inter shaft cavity 151.

It should be appreciated that the guiding tube 91 may be configured in any suitable manner to affect the swirl the cooling air flow 132. For example, the guiding tube may include a plurality of swirlers that impart swirl on the cooling air flow 132 or the guiding tube 91 may be configured to rotate at the same speed as the low speed shaft or the high speed shaft to impart swirl on the cooling air flow 132.

Further, the aft-most compressor stage 80A provides compressed air to the combustion section 26. More specifically, for the embodiment depicted, the combustion section 26 includes a stage of discharge nozzles 92, an inner combustor casing 94, and a combustor assembly 96. Further, the combustion section 26 defines a diffuser cavity 98, with the stage of discharge nozzles 92 located downstream of the aft-most compressor stage 80A of the HP compressor 24 and upstream of the diffuser cavity 98, such that compressor air from the aft-most compressor stage 80A is provided to the diffuser cavity 98 through the stage of discharge nozzles 92. The compressed air within the diffuser cavity 98 is, in turn, provided to the combustor assembly 96, where it is mixed with fuel and burned to generate the combustion gases 66. As is depicted, the combustor assembly 96 generally includes a fuel nozzle 100, an inner liner 102, and an outer liner 104, with the inner and outer liners 102, 104 together forming a combustion chamber 106.

It should be appreciated that the combustor assembly 96 may be configured as any suitable combustor assembly 96 for the gas turbine engine 10. For example, in certain embodiments, the combustor assembly 96 may be configured as an annular combustor assembly, a can combustor assembly, or a cannular combustor assembly.

Referring still to FIG. 2, as previously noted, the HP shaft 34 is drivingly connected to the HP compressor 24. For the embodiment depicted, the HP shaft 34 generally includes a central spool section including a central spool member 108 and a forward spool section 109 including a forward spool member 110. The central spool member 108 extends, for the embodiment depicted generally along the axial direction A at a location radially inward of the combustor assembly 96 of the combustion section 26. In certain exemplary embodiments, the central spool member 108 may define a substantially cylindrical shape. The forward spool member 110 extends generally from the central spool member 108 to the aft-most compressor stage 80A of the HP compressor 24 of the compressor section. More particularly, for the embodiment depicted, the HP shaft 34 forms, in part, a compressor discharge pressure seal 112, and the forward spool member 110 of the forward spool section 109 extends between the compressor discharge pressure seal 112 and the aft-most compressor stage 80A.

Further, as is depicted, for the embodiment of FIG. 2, the inner combustor casing 94 of the combustion section 26 also forms in part the compressor discharge pressure seal 112, such that the HP shaft 34 forms the compressor discharge pressure seal 112 with the inner combustor casing 94 of the combustion section 26. As is depicted, the inner combustor casing 94 forms a stator portion 114 of the compressor discharge pressure seal 112 and the HP shaft 34 forms a rotor portion 116 of the compressor discharge pressure seal 112 (the rotor portion 116 being rotatable relative to the stator portion 114). The stator portion 114 generally includes a seal pad 118 and the rotor portion 116 generally includes a plurality of seal teeth 120 configured to form a seal with the seal pad 118.

It should be appreciated, however, that in other exemplary embodiments, the compressor discharge pressure seal 112 may have any other suitable configuration.

Referring still to FIG. 2, it will be appreciated that the inner combustor casing 94 of the combustion section 26 is further configured for supporting the stage of discharge nozzles 92 and includes at least a portion positioned inward of the stage of discharge nozzles 92 along the radial direction R. More specifically, the inner combustor casing 94 generally includes an outer discharge nozzle case 122 and an inner discharge nozzle case 124. The outer discharge nozzle case 122 extends from the stage of discharge nozzles 92 generally outwardly along the radial direction R and forward along the axial direction A. For the embodiment depicted, the outer discharge nozzle case 122 is coupled to an outer combustor casing 126 and an outer compressor casing 128. However, in other embodiments the outer discharge nozzle case 122 may be coupled to any other suitable component of the gas turbine engine 10.

By contrast, the inner discharge nozzle case 124 extends from the stage of discharge nozzles 92 generally inwardly along the radial direction R and aft along the axial direction A. The stator portion 114 of the compressor discharge pressure seal 112 is coupled to, or formed integrally with, the inner discharge nozzle case 124.

As it will be appreciated, the exemplary gas turbine engine 10 generally defines an air flow passage 130 for providing a cooling air flow to cool the forward spool member 110 to a desired temperature. More specifically, the gas turbine engine 10 includes an air guide 134 positioned adjacent to the forward spool member 110 to define at least in part the air flow passage 130. Moreover, the air guide 134 defines a forward guiding passage 131 that fluidly couples the forward inter shaft cavity 151 with the air flow passage 130 such that the cooling air flow 132 that has been directed or routed into the forward inter shaft cavity 151 is used as the cooling air flow.

However, it should be appreciated that the cooling air flow 132 is provided by way of example only and in alternative exemplary embodiments, the cooling air flow may be any air flow suitable to cool the forward spool member.

Additionally, the air guide 134 includes an aft guiding passage 139 that fluidly couples the air flow passage 130 to an aft inter shaft cavity 152. The aft inter shaft cavity 152 is generally defined by an area between the HP shaft 34 and the LP shaft 36 and is radially inward of the combustion section 26. Further the aft inter shaft cavity 152 provides the cooling air flow that exits the air flow passage to a portion of the HP turbine 28 (not depicted for clarity) downstream of the aft guiding passage.

Figure 3:
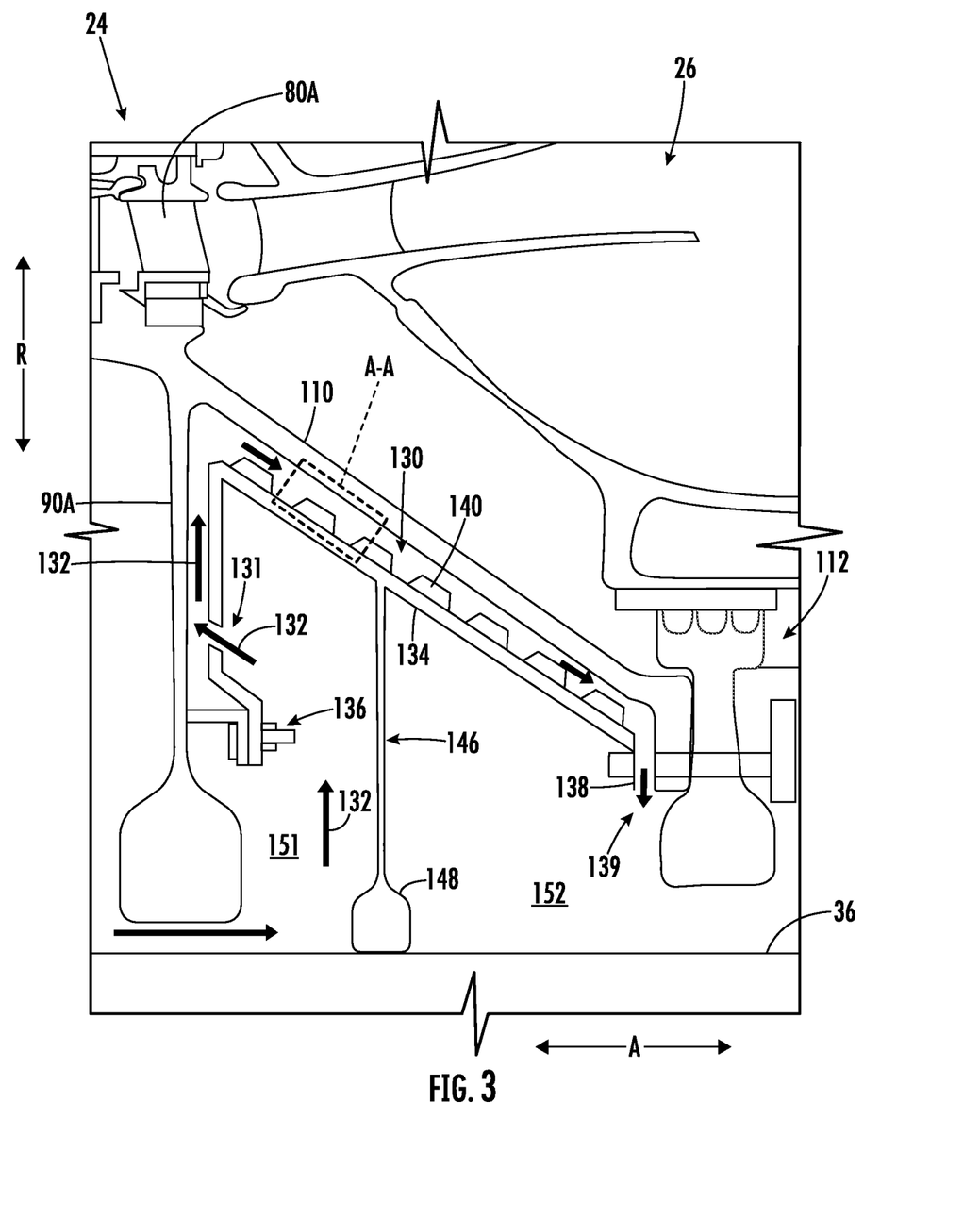
FIG. 3 is a close-up cross-sectional view of an aft end of the compressor section and of a forward end of the combustion section in accordance with the exemplary aspect of the present disclosure.

Referring now also to FIG. 3, a close-up view of an aft portion of the HP compressor 24 of the compressor section and a forward portion of the combustion section 26 is provided. As described above, the air guide 134 and the forward spool member 110 together define the air flow passage 130 for providing the cooling air flow 132 to the forward spool member 110 to cool the forward spool member 110. Additionally, as will be described in more detail below the air guide includes a plurality of turbulators 140 that protrude from a surface of the air guide into the air flow passage 130. The air guide 134 further includes a forward connection 136, an aft connection 138, and a seal member 146. The forward connection 136 connects the air guide 134 to the aft-most compressor stage 80A, and more specifically, the bore 90A of the aft-most compressor stage 80A. The aft connection 138 connects the air guide 134 to the HP shaft 34, and more specifically, to the compressor discharge pressure seal 112 of the HP shaft 34.

It should be appreciated that for the exemplary embodiment the forward connection 136 is configured as a flange that is formed integrally with the air guide 134. Similarly, the exemplary aft connection 138 is configured as a flange that is formed integrally with the air guide 134. Additionally, it should be appreciated that in the exemplary embodiment depicted, the aft connection 138 defines the aft guiding passage 139 that fluidly couples the air flow passage 130 and the aft inter shaft cavity 152.

However, in alternative exemplary embodiments it should be appreciated that the forward connection 136 and the aft connection 138 may be configured any suitable connection formed integrally with or coupled to the air guide 134. For example, the forward connection 136 or the aft connection 138 may be a curvic coupling, a rabbet joint, or a friction joint that is formed integrally with or coupled to the air guide 134.

Additionally, it should be appreciated that at least a portion of the air guide 134 may further extend circumferentially with the forward spool member 110, such that the air flow passage 130 defined therebetween is substantially annular.

Figure 4:
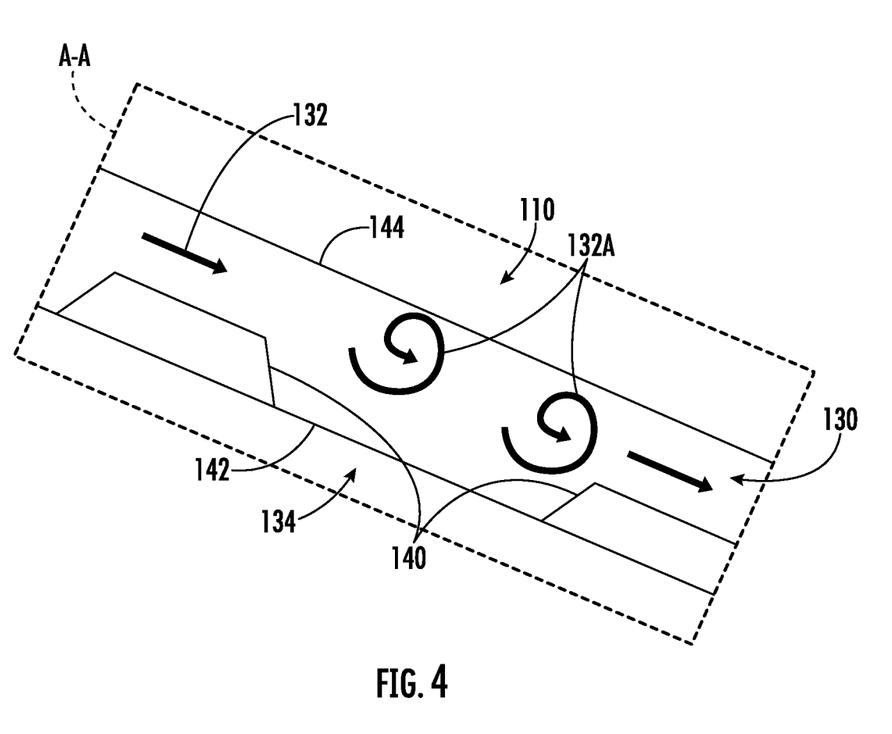
FIG. 4 is a close-up view of an air flow passage 130 of FIG. 3 taken along line A-A.

Referring now briefly to FIG. 4, a close-up view of the air flow passage 130 of FIG. 3 as indicated by Section A-A in FIG. 3 is provided. As is depicted, the air flow passage 130 is defined by a radially outward side 142 of the air guide and a radially inward side 144 of the forward spool member 110. Additionally, the plurality of turbulators 140 protrude from the radially outward side 142 of the air guide 134. "Plurality of turbulators 140", as used herein, may refer to any feature that protrudes from a surface of the air guide into the air flow passage and is configured to interact with the boundary layer of the cooling air flow 132. For example, the plurality of turbulators 140 may be configured as one or more of a canard, a vane, or a ridge. It should be appreciated that the shape, orientation, number, and configuration of the plurality of turbulators described herein are used only for the purpose of explaining aspects of the present subject matter. Other configurations are possible depending on the flow distributions of the cooling air flow 132 within the airflow passage.

During operation, the plurality of turbulators 140 are configured to trip a bounder layer of the cooling air flow 132 within the air flow passage 130. It should be appreciated that "trip the boundary layer" as referred to herein refers to the plurality of turbulators 140 disrupting a formation of a laminar boundary of the cooling air flow 132 near a surface (such as the radially outward side 142) of the air flow passage 130 and transitioning the laminar bounder of the cooling air flow 132 into a turbulent boundary of the cooling air flow 132, such as depicted a turbulent flow 132A. The turbulent flow 132A may enhance heat transfer from the forward spool member to the cooling air flow 132 and more specifically enhance the cooling of the forward spool member 110 during operation.

Referring now back to FIG. 3, as is depicted, the seal member 146 of the air guide 134 is operable with the LP spool 36 of the gas turbine engine 10 to form a fluid-tight connection with the LP spool 36. More particularly, the seal member 146 includes a bore 148 extending generally in the radial direction R to define a relatively tight clearance with the LP spool 36 and form the fluid-tight connection with the LP spool 36. The fluid tight connection formed by the seal member 146 defines at least in part the forward inter shaft cavity 151. Additionally, the fluid tight connection formed by the seal member 146 defines at least in part the aft inter shaft cavity 152.

It will be appreciated that as used herein, the term "fluid tight connection" refers a connection that prevents substantially all of an airflow (e.g., at least 90% by volume) on one side of the cavity from passing therethrough.

It should be appreciated that the seal member 146 may have any suitable configuration that provides a fluid tight connection with the LP spool 36. For example, in other embodiments, the bore 148 of the seal member 146 and LP spool 36 may include structure similar to the compressor discharge pressure seal 112 (e.g., the bore may include seal teeth and the LP spool 36 may include a pad, or vice versa).

Figure 5:
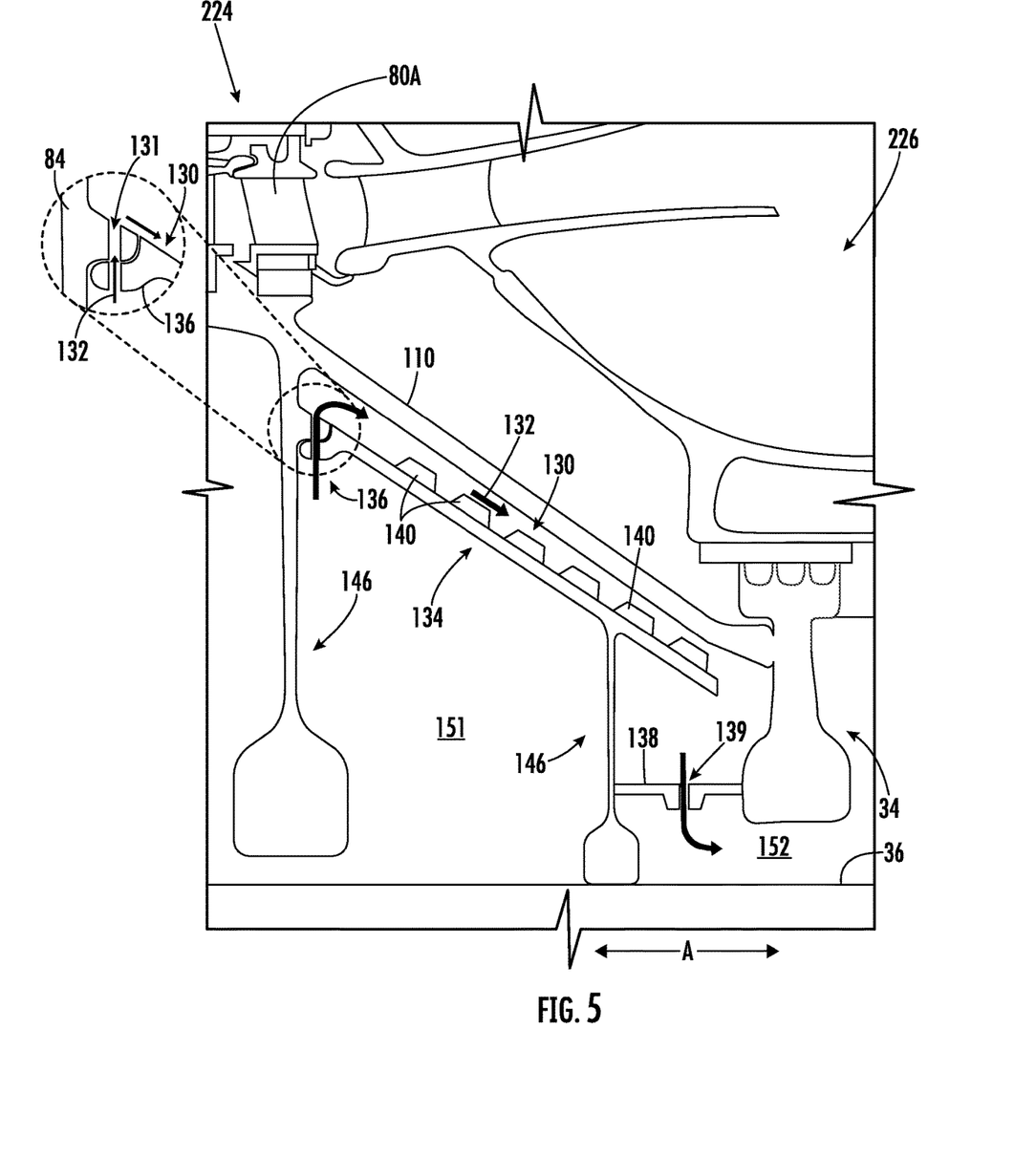
FIG. 5 is a close-up cross-sectional view of an aft end of the compressor section and of a forward end of the combustion section in accordance with another exemplary aspect of the present disclosure.

Referring now to FIG. 5, a close-up view of an aft portion of a HP compressor 224 of a compressor section and a forward portion of a combustion section 226 in accordance with another exemplary aspect of the present disclosure is provided. It should be appreciated that the exemplary compressor section and combustion section 226 may be incorporated into a gas turbine engine such as the gas turbine engine of FIG. 1. Additionally, the exemplary embodiment may be configured in substantially the same manner as the exemplary aft portion of the HP compressor 24 of the compressor and the forward portion of the combustion section 26 of FIG. 3, and accordingly, the same or similarly numbers may refer to the same or similar parts.

For example, the exemplary embodiment generally includes an air guide 134 having at least a portion positioned adjacent to a forward spool member 110 of a HP shaft 34 to define an air flow passage 130 for providing a cooling air flow 132 to the forward spool member 110. The air guide 134 defines a forward guiding passage 131 that fluidly couples a forward inter shaft cavity 151 with the air flow passage 130. Additionally, the air guide 134 defines an aft guiding passage 139 that fluidly couples the air flow passage with the aft inter shaft cavity 152. Further, the HP shaft 34 generally forms, in part, a compressor discharge pressure seal 112, and the forward spool member 110 extends between the compressor discharge pressure seal 112 and an aft-most compressor stage 80A.

Additionally, the air guide 134 generally includes a forward connection 136 that connects the air guide 134 to an aft-most compressor stage 80A of the HP compressor 224, an aft connection 138 that connects the air guide 134 to the HP shaft 34, a seal member 146 operable with a LP shaft 36 of the gas turbine engine to form a fluid-tight connection with the LP shaft 36, and a plurality of turbulators 140 that protrude into the air flow passage 130. Further, the fluid tight connection formed by the seal member 146 at least in part defines the forward inter shaft cavity 151. Moreover, the fluid tight connection formed by the seal member 146 generally defines at least in part the aft inter shaft cavity 152.

However, for the exemplary embodiment of FIG. 5, the forward connection 136 of the air guide 134 is configured as a rabbet joint that directly couples the air guide 134 to the aft-most compressor stage 80A. Additionally, as is depicted in callout circle A, the forward connection 136 defines the forward guiding passage 131 that fluidly couples the forward inter shaft cavity 151 with the air flow passage 130 such that the air flow passage 130 may provide the cooling air flow 132 to the forward spool member 110 to cool the forward spool member 110.

It should be appreciated that the forward guiding passage 131 defined by the forward connection 136 is provided by way of example only and may be configured in any suitable manner to fluidly couple the forward inter shaft cavity 151 and the air flow passage 130. For example, the forward guiding passage 131 may be a plurality of forward guiding passages 131 that are spaced circumferentially in the forward connection 136 and fluidly couple the forward inter shaft cavity 151 and the air flow passage 130.

Additionally, the aft connection 138 of the exemplary embodiment is configured as a curvic coupling that extends axially from the seal member 146 to the compressor discharge pressure seal 112. It should be appreciated that the aft connection 138 of the exemplary embodiment defines the aft guiding passage 139 that fluidly couples the air flow passage 130 and the aft inter shaft cavity 152.

It should be appreciated that the aft guiding passage 139 depicted is provided by way of example only and may be configured in any suitable manner to fluidly couple the air flow passage 130 and the aft inter shaft cavity 152. For example, the aft guiding passage 139 may be configured as a plurality of aft guiding passages 139 and that are spaced circumferentially in the aft connection 138 and fluidly couple the air flow passage 130 and the aft inter shaft cavity 152.

Figure 6:
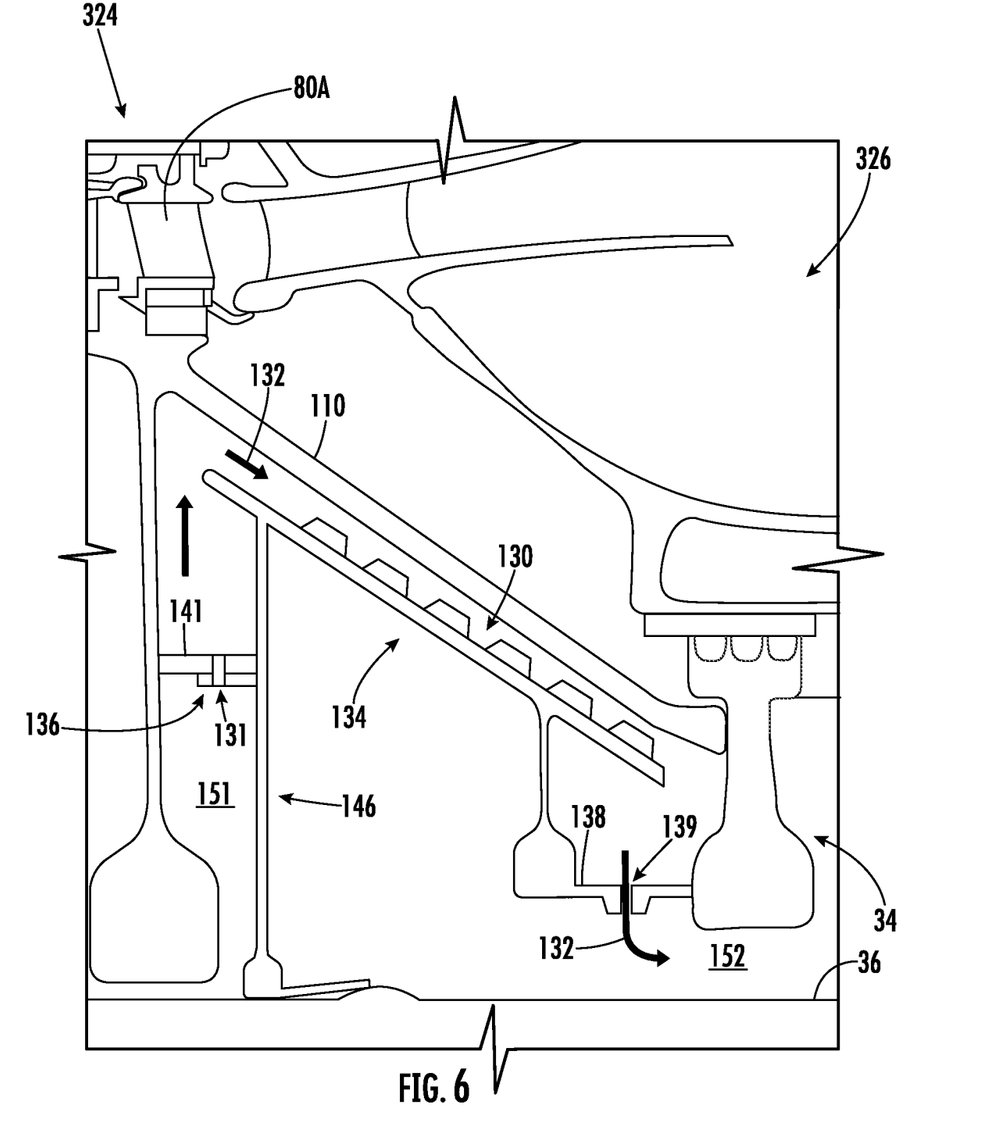
FIG. 6 is a close-up cross-sectional view of an aft end of the compressor section and of a forward end of the combustion section in accordance with another exemplary aspect of the present disclosure.

Referring now to FIG. 6, a close-up view of an aft portion of a HP compressor 324 of a compressor section and a forward portion of a combustion section 326 in accordance with another exemplary aspect of the present disclosure is provided. It should be appreciated that the exemplary compressor section and combustion section 326 may be incorporated into a gas turbine engine such as the gas turbine engine of FIG. 1. Additionally, the exemplary embodiment may be configured in substantially the same manner as the exemplary aft portion of the HP compressor 24 of the compressor and the forward portion of the combustion section 26 of FIG. 3, and accordingly, the same or similarly numbers may refer to the same or similar parts.

For example, the exemplary embodiment generally includes an air guide 134 having at least a portion positioned adjacent to a forward spool member 110 of a HP shaft 34 to define an air flow passage 130 for providing a cooling air flow 132 to the forward spool member 110. The air guide 134 defines a forward guiding passage 131 that fluidly couples a forward inter shaft cavity 151 with the air flow passage 130. Additionally, the air guide 134 defines an aft guiding passage 139 that fluidly couples the air flow passage with the aft inter shaft cavity 152. Further, the HP shaft 34 generally forms, in part, a compressor discharge pressure seal 112, and the forward spool member 110 extends between the compressor discharge pressure seal 112 and an aft-most compressor stage 80A.

Additionally, the air guide 134 generally includes a forward connection 136 that connects the air guide 134 to an aft-most compressor stage 80A of the HP compressor 324, an aft connection 138 that connects the air guide 134 to the HP shaft 34, a seal member 146, and a plurality of turbulators 140 that protrude into the air flow passage 130. Further, the fluid tight connection formed by the seal member 146 at least in part defines the forward inter shaft cavity 151 for providing a cooling air flow 132 from the compressor section to the air guide 134, and more specifically the air flow passage 130. Moreover, the fluid tight connection formed by the seal member 146 generally defines at least in part the aft inter shaft cavity 152 that provides the cooling air flow 132 that exits the air flow passage to a portion of a HP turbine (such as HP turbine 28 of FIG. 1) downstream of the aft guiding passage 139.

However, for the exemplary embodiment of FIG. 6, the forward connection 136 of the air guide is configured as a friction joint that couples the air guide 134 to the aft-most compressor stage 80A. More specifically, the forward connection 136 of the exemplary embodiment extends axially from the seal member of the air guide toward the aft most compressor stage. More particularly, the forward connection 136 is formed integrally with the seal member 146 and defines at least in part the forward guiding passage 131 that fluidly couples the forward inter shaft cavity 151 with the air flow passage 130 such that a cooling air flow 132 may cool the forward spool member 110. Additionally, the forward connection 136 of the air guide is circumferentially surrounded by a portion 141 of the aft most compressor stage 80A in such a manner that the forward connection 136 and the portion 141 of the aft most compressor stage may be frictionally coupled.

It should be appreciated that in alternative exemplary embodiments the forward connection 136 may be coupled to the seal member or formed in any other suitable manner.

It should be appreciated that the forward guiding passage 131 defined by the forward connection 136 is provided by way of example only and may be configured in any suitable manner to fluidly couple the forward inter shaft cavity 151 and the air flow passage 130. For example, the forward guiding passage 131 may be a plurality of forward guiding passages 131 that are spaced circumferentially in the forward connection 136 and fluidly couple the forward inter shaft cavity 151 and the air flow passage 130.

Additionally, the aft connection 138 of the exemplary embodiment is configured as a curvic coupling that extends axially from the seal member 146 to the compressor discharge pressure seal 112. It should be appreciated that the aft connection 138 of the exemplary embodiment defines the aft guiding passage 139 that fluidly couples the air flow passage 130 and the aft inter shaft cavity 152.

It should be appreciated that the aft guiding passage 139 depicted is provided by way of example only and may be configured in any suitable manner to fluidly couple the air flow passage 130 and the aft inter shaft cavity 152. For example, the aft guiding passage 139 may be configured as a plurality of aft guiding passages 139 and that are spaced circumferentially in the aft connection 138 and fluidly couple the air flow passage 130 and the aft inter shaft cavity 152.

Figure 7:
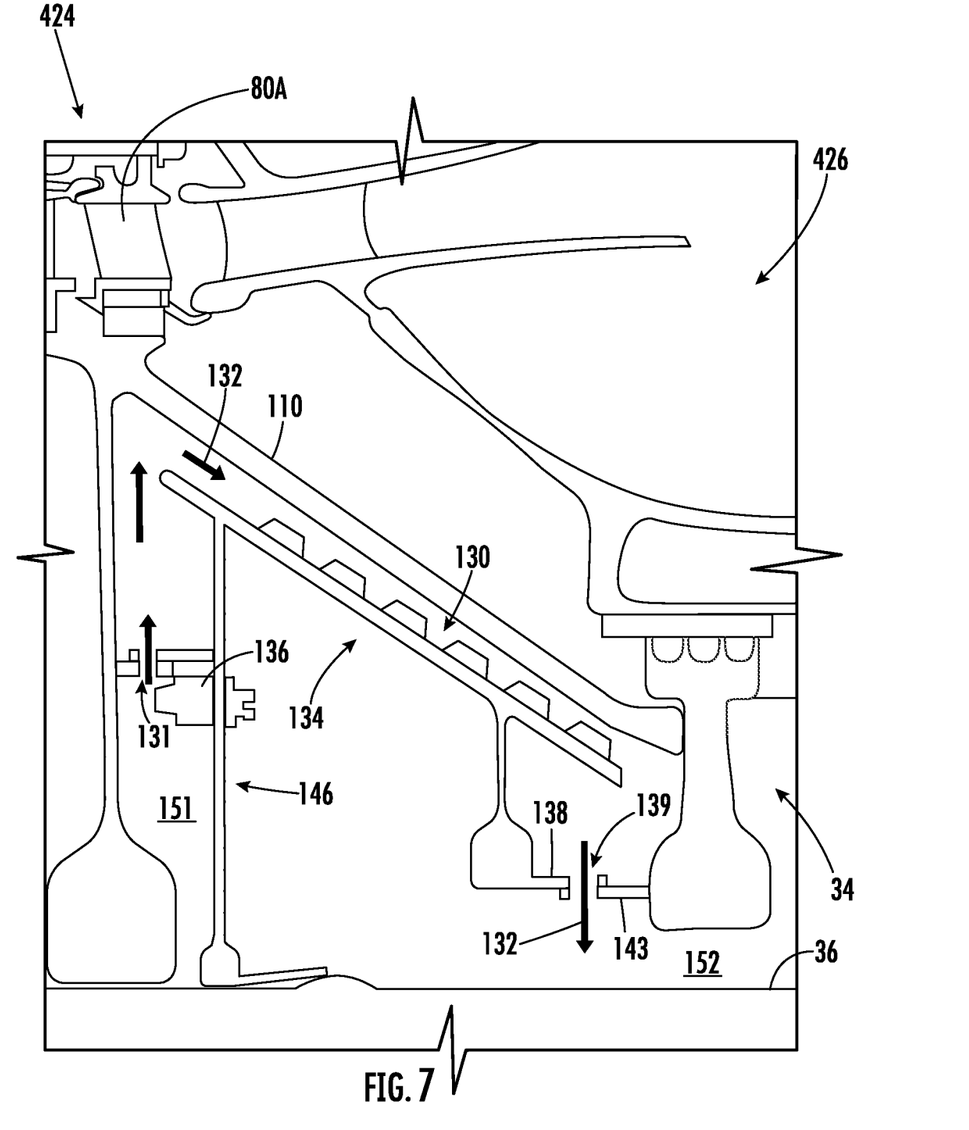
FIG. 7 is a close-up cross-sectional view of an aft end of the compressor section and of a forward end of the combustion section in accordance with another exemplary aspect of the present disclosure.

Referring now to FIG. 7, a close-up view of an aft portion of a HP compressor 424 of a compressor section and a forward portion of a combustion section 426 in accordance with another exemplary aspect of the present disclosure is provided. It should be appreciated that the exemplary compressor section and combustion section 426 may be incorporated into a gas turbine engine such as the gas turbine engine of FIG. 1. Additionally, the exemplary embodiment may be configured in substantially the same manner as the exemplary aft portion of the HP compressor 24 of the compressor and the forward portion of the combustion section 26 of FIG. 3, and accordingly, the same or similarly numbers may refer to the same or similar parts.

For example, the exemplary embodiment generally includes an air guide 134 having at least a portion positioned adjacent to a forward spool member 110 of a HP shaft 34 to define an air flow passage 130 for providing a cooling air flow 132 to the forward spool member 110. The air guide 134 defines a forward guiding passage 131 that fluidly couples a forward inter shaft cavity 151 with the air flow passage 130. Additionally, the air guide 134 defines an aft guiding passage 139 that fluidly couples the air flow passage with the aft inter shaft cavity 152. Further, the HP shaft 34 generally forms, in part, a compressor discharge pressure seal 112, and the forward spool member 110 extends between the compressor discharge pressure seal 112 and an aft-most compressor stage 80A.

Additionally, the air guide 134 generally includes a forward connection 136 that connects the air guide 134 to an aft-most compressor stage 80A of the HP compressor 324, an aft connection 138 that connects the air guide 134 to the HP shaft 34, a seal member 146 operable with a LP shaft 36 of the gas turbine engine to form a fluid-tight connection with the LP shaft 36, and a plurality of turbulators 140 that protrude into the air flow passage 130. Further, the fluid tight connection formed by the seal member 146 at least in part defines the forward inter shaft cavity 151 for providing a cooling air flow 132 from the compressor section to the air guide 134, and more specifically the air flow passage 130. Moreover, the fluid tight connection formed by the seal member 146 generally defines at least in part the aft inter shaft cavity 152 that provides the cooling air flow 132 that exits the air flow passage to a portion of a HP turbine (such as HP turbine 28 of FIG. 1) downstream of the aft guiding passage 139.

However, for the exemplary embodiment of FIG. 7, the forward connection 136 of the air guide is configured as a bolted joint that couples the air guide 134 to the aft-most compressor stage 80A. More specifically, the forward connection 136 is a bolted joint that is formed integrally with the seal member 146 and couples the air guide 134, and more particularly, the seal member 146 to the aft most compressor stage 80A. Further the forward connection 136 defines at least in part the forward guiding passage 131 that fluidly couples the forward inter shaft cavity 151 with the air flow passage 130 such that a cooling air flow 132 may cool the forward spool member 110.

It should be appreciated that the forward guiding passage 131 defined by the forward connection 136 is provided by way of example only and may be configured in any suitable manner to fluidly couple the forward inter shaft cavity 151 and the air flow passage 130. For example, the forward guiding passage 131 may be a plurality of forward guiding passages 131 that are spaced circumferentially in the forward connection 136 and fluidly couple the forward inter shaft cavity 151 and the air flow passage 130.

Additionally, the aft connection 138 of the exemplary embodiment is configured as a friction joint that extends that extends axially from the seal member 146 to the compressor discharge pressure seal 112. Additionally, the aft connection 138 of the air guide 134 circumferentially surrounds a portion 143 of the compressor discharge pressure seal 112 in such a manner that the aft connection 138 and the portion 143 of the compressor discharge pressure seal 112 may be coupled together by friction. It should be appreciated that the aft connection 138 of the exemplary embodiment defines the aft guiding passage 139 that fluidly couples the air flow passage 130 and the aft inter shaft cavity 152.

It should be appreciated that the aft guiding passage 139 depicted is provided by way of example only and may be configured in any suitable manner to fluidly couple the air flow passage 130 and the aft inter shaft cavity 152. For example, the aft guiding passage 139 may be configured as a plurality of aft guiding passages 139 and that are spaced circumferentially in the aft connection 138 and fluidly couple Referring now to FIG. 8, a close-up view of an aft portion of a HP compressor 524 of a compressor section and a forward portion of a combustion section 526 in accordance with another exemplary aspect of the present disclosure is provided. It should be appreciated that the exemplary compressor section and combustion section 526 may be incorporated into a gas turbine engine such as the gas turbine engine of FIG. 1. Additionally, the exemplary embodiment may be configured in substantially the same manner as the exemplary aft portion of the HP compressor 24 of the compressor and the forward portion of the combustion section 26 of FIG. 3, and accordingly, the same or similarly numbers may refer to the same or similar parts For example, the exemplary embodiment generally includes an air guide 134 having at least a portion positioned adjacent to a forward spool member 110 of a HP shaft 34 to define an air flow passage 130 for providing a cooling air flow 132 to the forward spool member 110. The HP shaft 34 generally forms, in part, a compressor discharge pressure seal 112, and the forward spool member 110 extends between the compressor discharge pressure seal 112 and an aft-most compressor stage 80A. Additionally, the air guide 134 generally includes a forward connection 136 that connects the air guide 134 to an aft-most compressor stage 80A of the HP compressor 324, an aft connection 138 that connects the air guide 134 to the HP shaft 34, and a plurality of turbulators 140 that protrude into the air flow passage 130.

Figure 8:
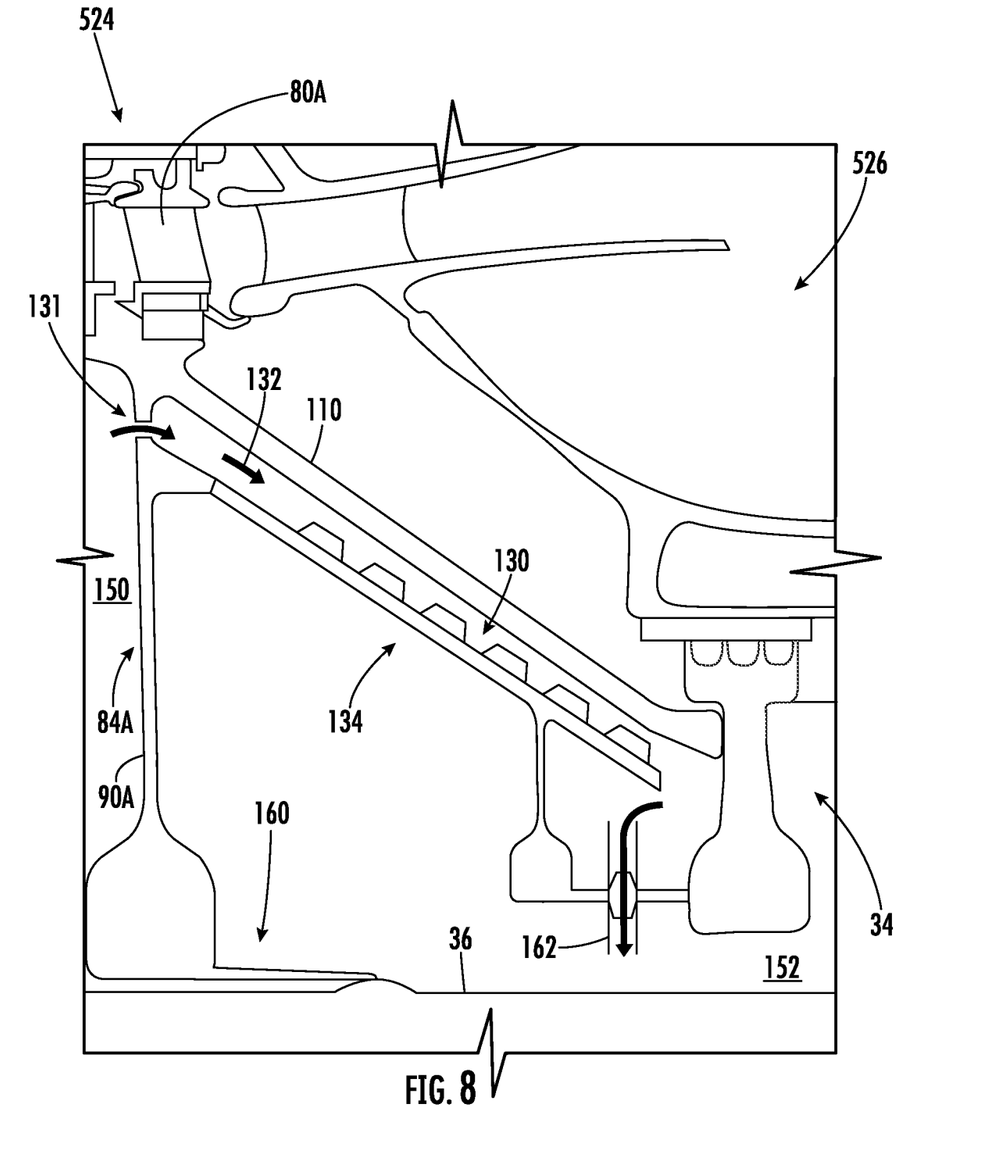
FIG. 8 is a close-up cross-sectional view of an aft end of the compressor section and of a forward end of the combustion section in accordance with another exemplary aspect of the present disclosure.

However, for the exemplary embodiment of FIG. 8, the HP compressor 524 defines a bleed air flow cavity 150 that has a cooling air flow 132 that has been directed or routed from an upstream portion of a working gas flow path (see e.g. FIG. 2). defined at least in part by the aft-most compressor stage 80A. Additionally the aft most compressor stage 80A defines a forward guiding passage 131 that fluidly couples the bleed air flow cavity 150 and the air flow passage. Additionally, for the exemplary embodiment depicted the aft-most compressor stage 80A includes a rotor 84A having a bore 90A. The bore 90A includes a seal member 160 operable with a LP shaft 36 of the gas turbine engine to form a fluid-tight connection with the LP shaft 36. The seal member 160 defines at least in part the bleed air flow cavity 150 and an aft inter shaft cavity 152

The air guide 134 defines a forward guiding passage 131 that fluidly couples a forward inter shaft cavity 151 with the air flow passage 130. Additionally, the air guide 134 defines an aft guiding passage 139 that fluidly couples the air flow passage with the aft inter shaft cavity 152. Further, the air guide includes a guiding tube 162 that fluidly couples the air flow passage and the aft inter shaft cavity 152. Additionally, the guiding tube 162 is configured to swirl the cooling air flow 132 in the circumferential direction C before being directed or routed into the aft inter shaft cavity 152.

It should be appreciated that the guiding tube 162 may be configured in any suitable manner to swirl the cooling air flow 132. For example, the guiding tube 162 may include a plurality of swirlers that impart swirl on the cooling air flow 132. Additionally, for example, the guiding tube may be configured to rotate at the same speed as the low speed shaft or the high speed shaft to impart swirl on the bleed air flow.

Further aspects are provided by the subject matter of the following clauses:

1. A gas turbine engine defining a radial direction and axial direction, the gas turbine engine comprising: a compressor section comprising a high pressure compressor, the high pressure compressor comprising an aft-most compressor stage, the aft-most compressor stage comprising a rotor; a low pressure shaft; a high pressure shaft drivingly coupled to the high pressure compressor, the high pressure shaft comprising a central spool member and a forward spool member, the forward spool member extending between the central spool member and the aft-most compressor stage; and an air guide coupled to the aft-most compressor stage and the high pressure shaft, the air guide and a radially inward side of the forward spool member together defining an air flow passage for providing a cooling air flow.

2. The gas turbine engine of any preceding clause, further comprising: a seal member operable with the low pressure shaft to form a fluid tight connection with the low pressure shaft.

3. The gas turbine engine of any preceding clause, wherein the seal member is formed integrally with or coupled to the air guide.

4. The gas turbine engine of any preceding clause, wherein the seal member defines at least in part a forward inter shaft cavity, and wherein the air guide defines a forward guiding passage that fluidly couples the forward inter shaft cavity and the air flow passage.

5. The gas turbine engine of any preceding clause, wherein the air guide comprises a forward connection, and wherein the forward connection couples the air guide to the aft-most compressor stage.

6. The gas turbine engine of any preceding clause, wherein the forward connection is a flange, a curvic coupling, a rabbet joint, a friction joint, or a combination thereof and wherein the forward connection defines the forward guiding passage.

7. The gas turbine engine of any preceding clause, wherein the seal member defines at least in part an aft inter shaft cavity and wherein the air guide defines an aft guiding passage that fluidly couples the air flow passage and the aft inter shaft cavity.

8. The gas turbine engine of any preceding clause, wherein the air guide comprises an aft connection, wherein the aft connection couples the air guide to the high pressure shaft.

9. The gas turbine engine of any preceding clause, wherein the aft connection is a flange, a curvic coupling, a rabbet joint, a friction joint, or a combination thereof and wherein the aft connection defines the aft guiding passage.

10. The gas turbine engine of any preceding clause, wherein the air guide comprises a radially outward side and a plurality of turbulators that protrude from the radially outward side and into the air flow passage, wherein the plurality of turbulators are configured to trip a boundary layer of the cooling air flow within the air flow passage.

11. An air guide for a gas turbine engine defining a radial direction, the gas turbine engine comprising a low pressure shaft, a high pressure compressor comprising an aft-most compressor stage, a high pressure shaft comprising a forward spool member, the forward spool member extending between the high pressure compressor and the high pressure shaft, the air guide comprising: a forward connection configured to be coupled to the aft-most compressor stage when the air guide is installed in the gas turbine engine; an aft connection configured to be coupled to the high pressure shaft when the air guide is installed in the gas turbine engine; and a seal member operable with the low pressure shaft to form a fluid tight connection with the low pressure shaft when the air guide is installed in the gas turbine engine.

12. The air guide of any preceding clause, further comprising: a plurality of turbulators that protrude from a radially outward side of the air guide.

13. The air guide of any preceding clause, wherein the forward connection is a flange, a curvic coupling, a rabbet joint, a friction joint, or a combination thereof.

14. The air guide of any preceding clause, wherein the forward connection defines a forward guiding passage.

15. The air guide of any preceding clause, wherein the aft connection is a is a flange, a curvic coupling, a rabbet joint, a friction joint, or a combination thereof.

16. The air guide of any preceding clause, wherein the aft connection defines an aft guiding passage.

17. The air guide of any preceding clause, wherein the seal member is formed integrally with or coupled to the air guide.

18. The air guide of any preceding clause, wherein the seal member defines at least in part a bleed air flow cavity.

19. The air guide of any preceding clause, wherein the seal member defines at least in part an inter shaft cavity.

20. The air guide of any preceding clause, wherein the air guide defines at least in part an airflow passage.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a radial direction and axial direction, the gas turbine engine comprising:
   a compressor section comprising a high pressure compressor, the high pressure compressor comprising an aft-most compressor stage, the aft-most compressor stage comprising a rotor;
   a low pressure shaft;
   a high pressure shaft drivingly coupled to the high pressure compressor, the high pressure shaft comprising a central spool member and a forward spool member, the forward spool member extending between the central spool member and the aft-most compressor stage;
   an air guide coupled to the aft-most compressor stage and the high pressure shaft, the air guide and a radially inward side of the forward spool member together defining an air flow passage for providing a cooling air flow; and
   a seal member operable with the low pressure shaft to form a fluid tight connection with the low pressure shaft, wherein the seal member is formed integrally with or coupled to the air guide.

2. The gas turbine engine of claim 1, wherein the seal member defines at least in part a forward inter shaft cavity, and wherein the air guide defines a forward guiding passage that fluidly couples the forward inter shaft cavity and the air flow passage.

3. The gas turbine engine of claim 2, wherein the air guide comprises a forward connection, and wherein the forward connection couples the air guide to the aft-most compressor stage.

4. The gas turbine engine of claim 3, wherein the forward connection is a flange, a curvic coupling, a rabbet joint, a friction joint, or a combination thereof and wherein the forward connection defines the forward guiding passage.

5. The gas turbine engine of claim 1, wherein the seal member defines at least in part an aft inter shaft cavity and wherein the air guide defines an aft guiding passage that fluidly couples the air flow passage and the aft inter shaft cavity.

6. The gas turbine engine of claim 5, wherein the air guide comprises an aft connection, wherein the aft connection couples the air guide to the high pressure shaft.

7. The gas turbine engine of claim 6, wherein the aft connection is a flange, a curvic coupling, a rabbet joint, a friction joint, or a combination thereof and wherein the aft connection defines the aft guiding passage.

8. The gas turbine engine of claim 1, wherein the air guide comprises a radially outward side and a plurality of turbulators that protrude from the radially outward side and into the air flow passage, wherein the plurality of turbulators are configured to trip a boundary layer of the cooling air flow within the air flow passage.

* * * * *